March 15, 1966 W. O. WEBER 3,239,887
CONTAINER LIP-FORMING MACHINE
Filed April 9, 1965 2 Sheets-Sheet 2

INVENTOR
WALTER O. WEBER
BY Cushman, Darby & Cushman
ATTORNEYS

United States Patent Office 3,239,887
Patented Mar. 15, 1966

3,239,887
CONTAINER LIP-FORMING MACHINE
Walter O. Weber, Newark, Del., assignor to Haveg Industries, Inc., Wilmington, Del., a corporation of Delaware
Filed Apr. 9, 1965, Ser. No. 446,943
17 Claims. (Cl. 18—19)

This invention relates to a container lip-forming machine and more particularly to the drive mechanism therefor.

Apparatuses for forming lips on containers have become increasingly refined with emphasis being placed on the speed by which lips are formed on the containers. Such advances in the art are typified by the United States patent to Edwards, 3,096,546 of July 9, 1963, and my copending applications, Serial No. 350,398, filed March 9, 1964, and Serial No. 366,319, filed May 11, 1964. These examples of improvements in the art use grooved or threaded members to form the lips on the containers. The grooves are helically formed on the surface of the members so that rotation thereof will impart a rotational and longitudinal movement to the containers through the passageway formed between a plurality of such grooved members equiradially disposed from a common central axis. The cross-sectional configuration of the groove varies throughout its length so as to deform or curl the rim of the container engaged therein gradually into a smoothly curled lip.

It is easily seen that the employment of a plurality of such helically grooved members requires that the angular or rotative position of each grooved member about its own axis must be held in a specific relation to each of the other members so that the container rim will be engaged in the same corresponding portion of the groove of each member at the same time. In one embodiment in my copending applications an endless chain was provided to operatively connect the members with each other so that the grooved members would maintain this angular relationship.

Because the problem of forming lips on containers is common to containers of various sizes, i.e., cross-sectional area, and because it is desirable to provide an apparatus with some flexibility, it is desirable to provide means for varying the size, i.e., cross-sectional area, of the passageway so that containers of various sizes can be accommodated. Of course, the problem which must be overcome is to maintain the same angular or rotative relationship between the groove members as they are moved to positions defining passageways of varying cross-sectional sizes. Of course, the grooved members could be moved into various positions defining passageways of varying diameters while maintaining a fixed angular relationship between the grooved members, but each position would require the drive means to be reconstructed.

Broadly, it is an object of this invention to provide a means for moving the groove lip-forming members between a plurality of predetermined positions defining passageways of varying diameters. Because of the problems mentioned above, it is a further object of this invention to provide positive means for maintaining the grooved members in a fixed angular relationship with each other in which the same corresponding portion of the groove of each member engages the container at the same time while accommodating movement of the groove members between the plurality of predetermined positions and for permitting rotational motion to be imparted to the grooved members.

It is also an object of this invention to provide positioning means for retaining the grooved members in the predetermined positions defining passageways of varying cross-sectional sizes or areas.

Likewise, it is an object of this invention to provide a drive means for the grooved members which will drive the grooved members with the same surface speed regardless of which predetermined position they are in. Furthermore, the drive means does not have to be changed for each position but rather will accommodate all positions of the grooved members. In the preferable form of the invention, it is an object of this invention to drive the grooved members through the idler gears.

Accordingly, these objects are manifested in one working embodiment comprising frame means; a plurality of helically grooved members having shafts extending axially therefrom and journaled for rotation within the frame means about parallel axes, the lower shaft having a gear secured thereto, the grooved members defining an annular passageway therebetween through which the containers pass, the cross-sectional configuration of the grooves varying throughout their length to perform a lip curling function as the containers move through the annular passageway, the grooved members being movable between a plurality of predetermined positions, defining passageways of varying cross-sectional area, in which the parallel axes of the grooved members are equiradially disposed from a common central axis at each position; a plurality of idler gear shafts journaled for rotation in the frame means about fixed axes, the idler gear shafts being symmetrical, parallel, and equiradially disposed from a common axis; a plurality of idler gears, each having an idler gear shaft journaled therein coaxial with its axis of rotation, the idler gears meshing with the gears of the grooved members for accommodating the movement of the grooved members between the plurality of predetermined positions while maintaining a fixed angular relationship between the grooved members and for permitting rotational motion to be imparted to the grooved members; a plurality of yoke means, each yoke means being secured at one end to an idler gear shaft and having the shaft of a grooved member journaled in the other end, the yoke means holding the grooved members operatively connected to the idler gears; a ring gear having the idler gears meshing therewith so as to be driven thereby; and means to rotate the ring gear.

These and other objects of this invention are more clearly depicted in the following detailed description having specific reference to the attached drawings in which the embodiments of the invention are shown, not to limit the scope of the invention in any respect but so that the principles thereof might be more clearly demonstrated.

In the drawings:

FIGURE 3 is an enlarged fragmentary side elevational view taken substantially along the lines 3—3 of FIGURE 2;

FIGURE 5 is a plan view of the retaining plate showing the position of the grooved members in phantom lines.

Figure 1:
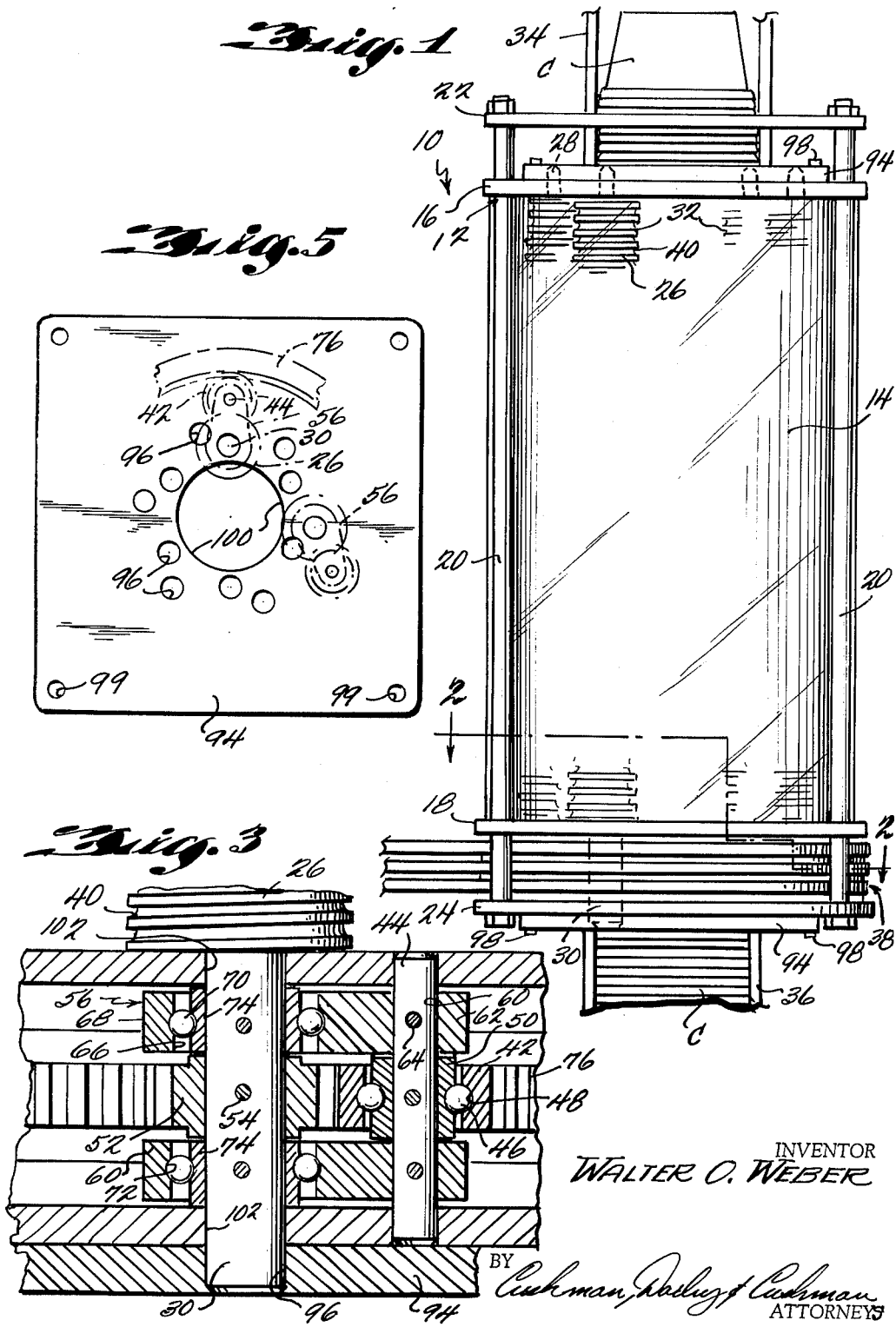
FIGURE 1 is a fragmentary side elevational view of the apparatus embodying the principles of the invention.

Referring to FIGURE 1, a container lip forming machine embodying the principles of the invention is illustrated at 10 and comprises a frame means 12, preferably including an optional cabinet 14 made of transparent material. The frame means 12 comprises upper and lower bearing plates 16 and 18 axially spaced from each other by axially extending support members 20. The support members 20 can extend through the upper and lower bearing plates to support auxiliary upper and lower bearing plates, 22 and 24, or additional support means could be provided to hold these auxiliary bearing plates at axially disposed positions from the bearing plates 16 and 18. All of the bearing plates have a central aperture 25 through which the containers C can pass.

A plurality of generally cylindrically grooved or threaded members 26 are journaled for rotation in the upper and lower bearing plates 16 and 18 by means of upper axial extensions or shafts 28 and lower axial extensions or shafts 30 (shown in FIGURE 3), respectively. The grooved members 26 are rotated about parallel axes which are symmetrically and equiradially disposed from a common central axis so as to define a generally cylindrical passageway 32 through which the containers C pass.

A feeder 34 is shown mounted on top of the auxiliary upper bearing plate 22 and is axially aligned with the passageway 32 formed by the plurality of grooved members 26. At the opposite end of the passageway 32 a suitable receiver 36 is positioned to receive the discharged containers. It will be appreciated that the containers can either be placed in the feeder manually or the containers can be conveyed to the feeder 34 from a cutting or forming station, not shown. While this invention discloses a stack of inverted containers which are nested, it is possible to feed the containers in an upright position and to underfeed the machine so that each container goes through the lip-forming grooved members separately. These features do not form part of this invention but are mentioned only to illustrate broadly the type of lip-forming machine shown in the drawings. A more detailed discussion of the lip-forming functions of these machines can be found in my copending applications mentioned above. Furthermore, inasmuch as the primary object of this invention is to provide the lip-forming machine with flexibility for holding containers of varying diameters, the feeder and receiver will either have to be changed or have means to accommodate the containers of varying cross-sectional sizes or diameters, as measured across the rim end of the containers.

The lower bearing plate 18 and the auxiliary lower bearing plate 24 are shown supporting a drive means 38 therebetween. As shown the drive means is operatively associated with the grooved members 26 for imparting a rotational movement to the grooved members. The rotating grooved members impart a rotational and axial translational movement to the containers by means of helical grooves 40 engaging the rims of the containers C. The helical groove 40 has a cross-sectional configuration varying throughout its length, the variance in the cross-sectional configuration causing the rim of the container to curl or deform into a smooth lip. Because of the use of grooves of varying cross-sectional configuration to form the lips on the containers, the rotational or angular, referring to the cylindrical system of coordinates, relationship of each member about its own axis must be held in a specific relationship to each of the other members. If this is not done, the containers would be positioned incorrectly between the plurality of grooved members, some grooves being advanced or retarded from a balanced position.

Accordingly, in varying the transverse cross-sectional size or area of the passageway to accommodate containers of different sizes, it is necessary to provide some positive means for maintaining the grooved members in a fixed angular relationship with each other in which the same corresponding portion of the groove of each member engages the container at the same time, while accommodating the movement of the grooved member between a plurality of predetermined positions defining passageways of varying diameters. Besides maintaining the grooved members in a fixed angular relationship while accommodating movement between a plurality of predetermined positions, the positive means in the preferred embodiment imparts a rotational movement to the grooved members. Thus, in effect the positive means forms a part of the drive mechanism, which broadly comprises the drive means and the positive means. For the purpose of illustrating this invention, the positive means is distinguished from the drive means and is said to operatively connect the drive means to the grooved members in the preferred embodiment of the invention for imparting a rotational motion thereto.

Figure 2:
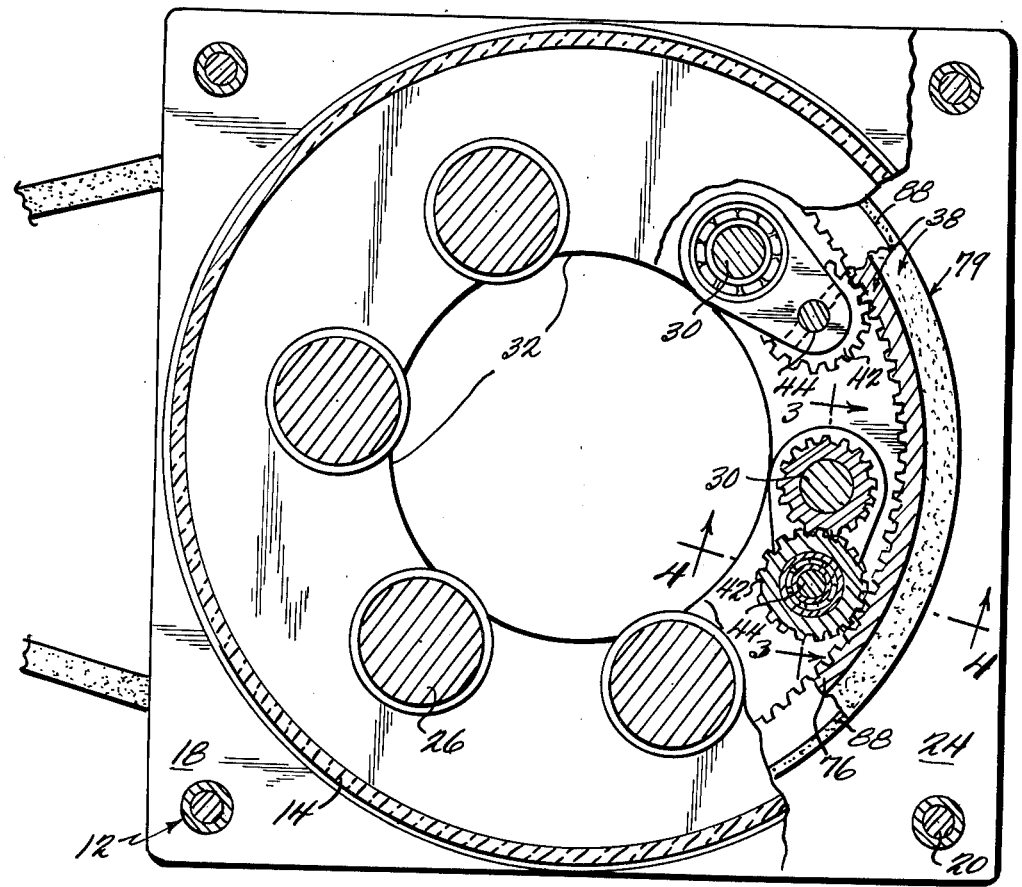
FIGURE 2 is an enlarged plan view taken substantially along the lines 2—2 in FIGURE 1 with parts broken away for clarity.
Figure 4:
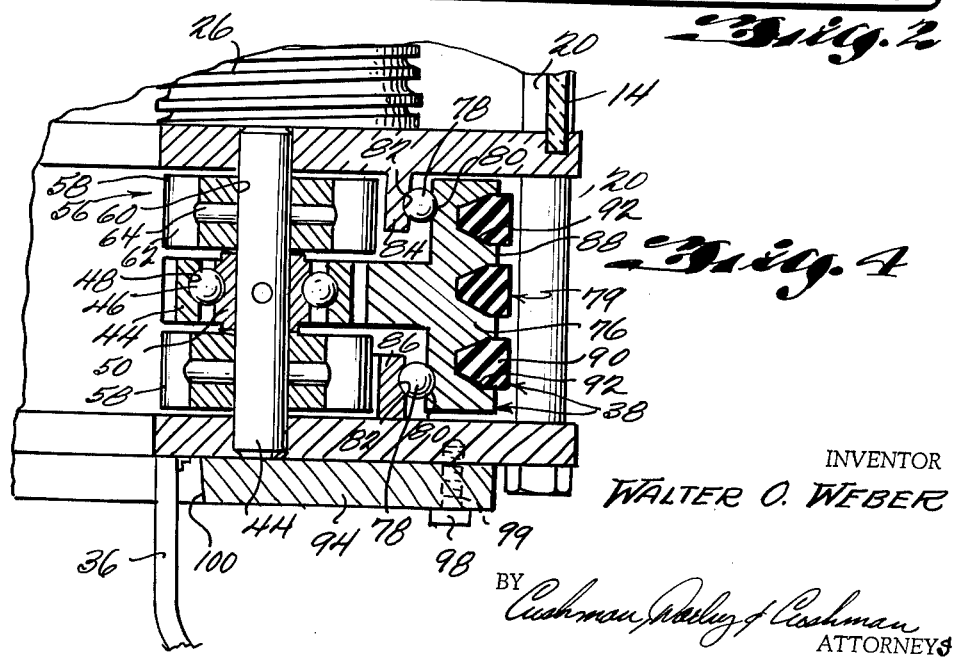
FIGURE 4 is an enlarged fragmentary side elevational view taken substantially along the lines 4—4 of FIGURE 2.

As shown more specifically in FIGURES 2, 3 and 4, the positive means comprises a plurality of idler gears 42 rotating about fixed axes defined by idler gear shafts 44 journaled in the lower bearing plate 18 and the auxiliary lower bearing plate 24. As illustrated, each gear shaft is not attached to its idler gear, but rather the idler gear revolves about the gear shaft on ball or roller bearings 46 secured within a raceway 48 formed internally of the idler gear 42 and a roller or ball bearing sleeve 50 secured to the idler gear shaft 44. The lower axial extension or shaft 30 of the grooved members 26 has a gear 52 secured thereto by a pin 54 in a position for operative engagement with the idler gear 42 so as to be rotatably driven thereby. The positive means also includes a means for maintaining each grooved member in an operative relationship with an idler gear 42 so as to be driven thereby. Accordingly, it is seen that a yoke means 56 is provided comprising a pair of link plates 58 for holding the gear 52 of the grooved members in operative relation with the idler gear 42. The link plates 58 have a first opening 60 at one end 62 thereof through which the idler gear shaft 44 is positioned. A link plate is shown secured to the idler gear shaft 44 by means of pins 64, although it will be appreciated that the idler gear shafts 44 could be freely journaled in the link plates 58 and that one link plate would suffice. The link plates have a second opening 66 at the second end 68 thereof with the shafts 30 of the grooved members journaled therein by bearing means 70, such as a ball or roller bearing. A raceway 72 is formed internally of the opening 60 and cooperates with a sleeve 74 attached to the lower shaft 30 to form a housing for the bearing means 70.

The lip-forming apparatus also includes a drive means for rotating the grooved members simultaneously and at the same surface speed so that the fixed angular relationship of the grooved members will not get out of balance. The drive means is so constructed that it accomplishes this function at each predetermined position assumed by the grooved members without having to be readjusted or modified to continue its operative engagement with the grooved members. This feature provides economical and practical flexibility. In the preferable form of the invention the drive means comprises a ring gear 78 and a means 79 to drive the ring gear. As illustrated the ring gear has a T-shaped cross-sectional configuration. The ring gear rotates on bearing means 78, such as a ball, or roller bearing, positioned in a housing defined by a raceway 80 formed internally of the ring gear 76 and a raceway 82 formed externally on annular rings, 84 and 86, projecting from the lower 18 and auxiliary lower 24 bearing plates respectively. The idler gears are positioned internally of the ring gear and are all engaged simultaneously by the ring gear. The means 79 to drive the ring gear engages the ring gear 76, preferably on its exterior surface 88, and imparts a rotational movement thereto which drives the idler gears and grooved members. As illustrated, the means 79 to drive the ring gear comprises a V-belt 90 cooperating with V-belt sheaves 92 formed externally in the ring gear, although it could easily comprise another gear arrangement or any other common type of drive mechanism. The drive means could in fact be connected directly to the groove members so long as the same surface speed and angular relation could be maintained between the grooved members.

Considering the adjustable feature of the invention, it will be seen that the yoke means 56 maintains the grooved members in operative relation with the idler gears so that they can be driven thereby and accommodates movement of the grooved members about the circumference of the idler gear, while the idler gears assure that the grooved members will maintain substantially the same angular relation to each other. The movement of the grooved members about the circumference of the idler gear enables the grooved members to assume a plurality of positions of different radii thereby defining passageways 32 of varying diameter or transverse cross-sectional area. Inasmuch as the passageway 32 is defined by grooved members equiradially disposed from a common central axis, each grooved member must rotate a like amount around its idler gears so as to maintain an equiradial relationship with the common axis. Because each grooved member rotates a like amount around identical idler gears, a symmetric relationship and hence a fixed angular relationship is maintained between the grooved members. It is realized, of course, that all of the grooved members must move in the same direction, e.g., clockwise around the circumference of the idler gears or around the axes of the idler gears, in order to maintain a fixed angular relationship with each other.

The idler gears are illustrated as being identical. Any mechanical arrangement between the drive means, grooved members, and idler gears can be utilized, though, so long as the surface speed of all of the grooved members remains identical and so long as the fixed angular relationship between the grooved members remains the same both during the actual driving of the grooved members and during the changing of positions by grooved members to accommodate containers of varying sizes.

As seen more specifically in FIGURE 2, the present construction enables the grooved members to form a passageway of maximum diameter when the grooved members have rotated about the idler gears to a position adjacent the ring gear. From this position, the grooved members can move into a position in which they are radially aligned between the idler gear axis and the common central axis, as shown in phantom lines in FIGURE 5. Such a position defines the minimum passageway of which this apparatus is capable. It will be seen that by simply modifying the construction and configuration of the gears, the grooved members could be allowed to rotate over the ring gear, since as the ring gear could be positioned in a plane below the gear 52, and form an even larger passageway. It is seen that in all positions of the grooved members, the ring gear maintains the same relative position with respect to the frame means. That is, it is not necessary to modify or realign the ring gear with each separate position of the grooved members.

It is also within the scope of this invention to maintain a retaining means such as a plate 94 for retaining the grooved members in the predetermined positions defining passageways of varying cross-sectional sizes. The plate has a plurality of sets of holes 96 for receiving either the upper 28 or lower 30 shafts of the grooved members. Once the plate is attached to the frame means, such as the auxiliary lower bearing plate, it will be seen that the holes 96 are arcuately or angularly aligned along a path subtended by the rotational movement of the hole 66 in the yoke means or the shafts of the grooved members around the fixed axis of the idler gear. The plate is detachably secured to the frame means by screw means 98 extending through holes 99, or any other type of releasable securing means, so that the grooved members can easily be changed from one predetermined position to another. A central hole 100 allows the containers to pass through the retaining plate and can be large enough to slide over the feeder 34 and receiver 36. The plate 94 and holes 96 can cooperate with either the upper or lower shafts of the grooved members, and in most instances, it will be preferable to have a pair of plates co-operating with the upper and lower shafts so as to provide sufficient bearing support for the rotating grooved members. It will be appreciated that the upper and lower shafts of the grooved members are journaled in arcuate slots 102 in the bearing plates, the arcuate slots being aligned along angular paths subtended by the rotatable movement of the hole 66 in the yoke means around the fixed axes of the idler gears. Furthermore, these arcuate slots could accomplish the function of the yoke means if they were machined and constructed to the precision of the yoke means, for the arcuate slots could maintain each grooved member operatively positioned with one idler gear so as to be driven thereby and so as to accommodate movement of the grooved member about the circumference of the idler gear.

It can also be seen that the predetermined positions may be so close to each other that the holes 96 overlap. If the overlap of holes is found to be undesirable because the grooved members are not journaled properly, a separate plate for each predetermined position or for just a few predetermined positions could be used.

As illustrated, the central hole 100 may be too small to accommodate large containers when the grooved members form a passageway of maximum cross-sectional area. To make the hole 100 larger would eliminate the holes of shortest radial distance from a common central axis, thereby preventing the grooved members from assuming a position defining a passageway of minimum cross-sectional area. Accordingly, different plates may have to be used to accommodate larger and smaller containers. The retaining plates 94 with smaller central holes will either have to have a means for accommodating the larger feeder and receiver or the feeder and receiver will have to be changed or modified to correspond to the container size.

It will be appreciated that other retainer means could be provided for locking the upper and lower shafts of the grooved members in position. For example, the retainer-plate concept could be eliminated and the means for locking the upper and lower shafts of the grooved members in position could be incorporated in the upper and lower bearing plates or in the auxiliary upper and lower bearing plates. Furthermore, the yoke means could include means to key itself in predetermined positions and thus provide the retaining means for locking the upper and lower shafts of the grooved members in position.

While a preferred form of the invention has been illustrated in the drawings and discussed above, it should be adequately clear that considerable modification may be made thereto without departing from the principles of the invention. Therefore, the foregoing should be considered in an illustrative sense rather than a limiting sense, and accordingly the extent of this invention should be limited only by the spirit and scope of the claims appended hereto.

I claim:

1. An apparatus for forming an annular smooth lip on a container comprising:
   frame means;
   a plurality of helically grooved members having shafts extending axially therefrom and journaled for rotation within the frame means about parallel axes, the grooved members defining an annular passageway therebetween through which the containers pass, the cross-sectional configuration of the grooves varying throughout their length to perform a lip curling function as the containers move through the annular passageway, the grooved members being movable between a plurality of predetermined positions, defining passageways of varying cross-sectional area in which the parallel axes of the grooved members are equiradially disposed from a common central axis at each position;

positive means for maintaining the grooved members in a fixed angular relationship with each other in which the same corresponding portion of the groove of each member engages the container at the same time while accommodating movement of the grooved members between the plurality of predetermined positions; and drive means for imparting a rotational motion to the grooved members, the grooved members being rotated simultaneously and at the same surface speed and the drive means being operatively connected to the grooved members at each predetermined position.

2. An apparatus for forming an annular smooth lip on a container comprising:

frame means;

a plurality of helically grooved members having shafts extending axially therefrom and journaled for rotation within the frame means about parallel axes, the grooved members defining an annular passageway therebetween through which the containers pass, the cross-sectional configuration of the grooves varying throughout their length to perform a lip curling function as the containers move through the annular passageway, the grooved members being movable between a plurality of predetermined positions, defining passageways of varying cross-sectional area, in which the parallel axes of the grooved members are equiradially disposed from a common central axis at each position;

positive means for maintaining the grooved members in a fixed angular relationship with each other in which the same corresponding portion of the groove of each member engages the container at the same time while accommodating movement of the grooved members between the plurality of predetermined positions and for permitting rotational motion to be imparted to the grooved members; and drive means operatively associated with the grooved members through the positive means for imparting a rotational motion to the grooved members, the grooved members being rotated simultaneously and at the same surface speed.

3. The apparatus defined in claim 2 wherein the positive means comprises a plurality of idler gears journaled for rotation about fixed parallel axes within the frame means and means for maintaining each grooved member operatively connected to one idler gear so as to be driven thereby and so as to accommodate movement of the grooved member about the circumference of the idler gear.

4. The apparatus defined in claim 3 wherein the means for maintaining the grooved members operatively connected to each idler gear comprises yoke means having one of the gear shafts of each grooved member and the means defining the axis of each idler gear extending therethrough.

5. The apparatus defined in claim 4 wherein the yoke means comprise at least one link plate for each idler gear having a first opening at one end in which the means defining the axis of the idler gear is received and a second opening at the other end in which the shaft of the grooved member is journaled.

6. The apparatus defined in claim 3 wherein one of the shafts of each grooved member has a gear secured thereto which is held in a meshing relationship with an idler gear so as to be driven thereby.

7. The apparatus defined in claim 2 wherein the positive means comprises a plurality of idler gear shafts journaled for rotation in the frame means, the idler gear shafts being symmetrical, parallel, and equiradially disposed from a common central axis, a plurality of idler gears each having an idler gear shaft journaled therein coaxial with its axis of rotation, a plurality of yoke means, each yoke means being secured at one end to an idler gear shaft and having the shaft of a grooved member journaled in the other end, the yoke means holding the grooved members operatively connected to the idler gears.

8. The apparatus defined in claim 2 wherein the drive means simultaneously engages the idler gears for imparting a rotational movement to each idler gear, the grooved members being driven by the idler gears and having equal surface speeds.

9. The apparatus defined in claim 8 wherein the drive means comprises a rotatably driven ring gear, the idler gears rotating about fixed axes and meshing with the ring gear so as to be driven thereby, and means to rotate the ring gear.

10. The apparatus defined in claim 9 wherein the idler gears are rotated about fixed axes internally of the ring gear and meshing therewith.

11. The apparatus defined in claim 2 additionally comprising positioning means for retaining the grooved members in predetermined positions defining passageways of varying cross-sectional areas.

12. The apparatus defined in claim 11 wherein the positioning means comprises a plate detachably secured to the frame means, the plate having means for receiving the shaft of the grooved member and for holding it in the predetermined positions.

13. The apparatus defined in claim 12 wherein each plate has a plurality of holes aligned along angular paths defined by the movement of the shafts of the grooved members as the grooved members rotate about the idler gears.

14. The apparatus defined in claim 12 wherein there are at least two plates and the upper and lower axial shaft of each grooved member are journaled in at least one plate.

15. An apparatus for forming an annular smooth lip on a container comprising:

frame means;

a plurality of helically grooved members having shafts extending axially therefrom and journaled for rotation within the frame means about parallel axes, the lower shaft having a gear secured thereto, the grooved members defining an annular passageway therebetween through which the containers pass, the cross-sectional configuration of the grooves varying throughout their length to perform a lip curling function as the containers move through the annular passageway, the grooved members being movable between a plurality of predetermined positions, defining passageways of varying cross-sectional area, in which the parallel axes of the grooved members are equiradially disposed from a common central axis at each position;

a plurality of idler gear shafts journaled for rotation in the frame means about fixed axes, the idler gear shafts being symmetrical, parallel, and equiradially disposed from a common central axis;

a plurality of idler gears, each having an idler gear shaft journaled therein coaxial with its axis of rotation, the idler gears meshing with the gears of the grooved members for accommodating the movement of the grooved members between the plurality of predetermined positions while maintaining a fixed angular relationship between the grooved members and for permitting rotational motion to be imparted to the grooved members;

a plurality of yoke means, each yoke means being secured at one end to an idler gear shaft and having the shaft of a grooved member journaled in the other end, the yoke means holding the grooved members operatively connected to the idler gears;

a ring gear having the idler gears meshing therewith so as to be driven thereby; and means to rotate the ring gear.

16. The apparatus defined in claim 15 additionally comprising positioning means for retaining the grooved members in predetermined positions defining passageways of varying cross-sectional areas.

17. An apparatus for forming an annular smooth lip on a container comprising:

frame means;

a plurality of helically grooved members having shafts extending axially therefrom and journaled for rotation within the frame means about parallel axes, the lower shaft having a gear secured thereto, the grooved members defining an annular passageway therebetween through which the containers pass, the cross-sectional configuration of the grooves varying throughout their length to perform a lip curling function as the containers move through the annular passageway, the grooved members being movable between a plurality of predetermined positions, defining passageways of varying cross-sectional area, in which the parallel axes of the grooved members are equiradially disposed from a common central axis at each position;

a plurality of idler gear shafts journaled for rotation in the frame means about fixed axes, the idler gear shafts being symmetrical, parallel, and equiradially disposed from a common central axis;

a plurality of idler gears, each having an idler gear shaft journaled therein coaxial with its axis of rotation, the idler gears meshing with the gears of the grooved members for accommodating the movement of the grooved members between the plurality of predetermined positions while maintaining a fixed angular relationship between the grooved members and for permitting rotational motion to be imparted to the grooved members;

a plurality of link plates, each having a first opening at one end in which an idler gear shaft is received and a second opening at the other end in which the shaft of a grooved member is journaled, the link plates holding the gears on the shafts of the grooved members in a meshing relationship with the idler gears;

a ring gear having the idler gears meshing internally therewith so as to be driven thereby;

means to rotate the ring gear; and a plurality of plates detachably secured to the frame means, each having a plurality of sets of holes aligned along angular paths defined by the movement of the shafts of the grooved members as the grooved members rotate about the idler gears, the upper and lower axial shafts of each grooved member being journaled in at least one plate in the same corresponding hole in which the other members are journaled so as to define a passageway of predetermined cross-sectional area.

References Cited by the Examiner

UNITED STATES PATENTS

| | | | |
|---|---|---|---|
| 3,096,546 | 9/1963 | Edwards | 18—19 XR |
| 3,121,655 | 2/1964 | Dickison | 18—19 XR |
| 3,192,565 | 7/1965 | Rukavina | 18—19 |

WILLIAM J. STEPHENSON, *Primary Examiner.*